(12) United States Patent
Yamada

(10) Patent No.: US 9,608,524 B2
(45) Date of Patent: Mar. 28, 2017

(54) DC POWER SUPPLY EQUIPMENT

(71) Applicant: FUJI ELECTRIC CO., LTD., Kawasaki (JP)

(72) Inventor: Ryuji Yamada, Hachioji (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 14/822,459

(22) Filed: Aug. 10, 2015

(65) Prior Publication Data
US 2016/0065077 A1 Mar. 3, 2016

(30) Foreign Application Priority Data

Aug. 26, 2014 (JP) ................. 2014-171047

(51) Int. Cl.
*H02M 1/00* (2006.01)
*H02M 3/28* (2006.01)
*H02M 1/42* (2007.01)

(52) U.S. Cl.
CPC ............ *H02M 3/285* (2013.01); *H02M 1/42* (2013.01); *H02M 2001/0045* (2013.01); *H02M 2001/0074* (2013.01); *Y02B 70/12* (2013.01)

(58) Field of Classification Search
CPC . H02M 2001/0074; H02M 2001/0077; H02M 3/22; H02M 3/285; H02M 2001/0045; H02M 2001/0067; H02M 2001/007; H02J 1/10; H02J 1/102; H02J 2001/106
USPC ............... 363/13, 15, 16, 20, 21.01
See application file for complete search history.

(56) References Cited

U.S. PATENT DOCUMENTS

| | | | | |
|---|---|---|---|---|
| 5,682,303 A | * | 10/1997 | Goad ............ | H02J 1/102 307/82 |
| 6,094,366 A | * | 7/2000 | Kalfhaus ........ | H02M 1/4258 363/73 |
| 2001/0012207 A1 | * | 8/2001 | Nomura ......... | H02M 3/33569 363/17 |
| 2002/0126517 A1 | * | 9/2002 | Matsukawa ..... | H02M 3/33569 363/69 |
| 2004/0233685 A1 | * | 11/2004 | Matsuo .......... | H02M 3/285 363/65 |
| 2005/0254272 A1 | * | 11/2005 | Vinciarelli ....... | H02M 3/157 363/65 |

(Continued)

FOREIGN PATENT DOCUMENTS

| | | |
|---|---|---|
| JP | 2001-051733 | 2/2001 |
| JP | 2006-333625 | 12/2006 |
| JP | 2014-018028 | 1/2014 |

*Primary Examiner* — Jessica Han
*Assistant Examiner* — David A. Singh

(57) ABSTRACT

A power supply equipment includes a plurality of units each including a capacitor and an isolated DC-DC converter connected between the both terminals of the capacitor, wherein DC input sides of the plurality of units are connected in series and the DC output sides are connected together in parallel. The DC power supply equipment also comprises control circuits to control the isolated DC-DC converters. The control circuits generate operation commands to operate some of the plurality of units in an alternating sequence with a same time ratio in a predetermined control period in a light load condition, and the control circuits control the isolated DC-DC converters of the units according to the operation command.

21 Claims, 9 Drawing Sheets

(56) References Cited

U.S. PATENT DOCUMENTS

| | | | | |
|---|---|---|---|---|
| 2005/0286277 | A1* | 12/2005 | Krein | H02J 1/102 |
| | | | | 363/65 |
| 2007/0086224 | A1* | 4/2007 | Phadke | H02M 3/285 |
| | | | | 363/65 |
| 2009/0116266 | A1* | 5/2009 | Lai | H02M 7/493 |
| | | | | 363/40 |
| 2010/0067263 | A1* | 3/2010 | Qian | H02M 3/285 |
| | | | | 363/21.12 |
| 2011/0127976 | A1* | 6/2011 | Hiltbrunner | H02M 3/1584 |
| | | | | 323/272 |
| 2012/0043923 | A1* | 2/2012 | Ikriannikov | H02J 1/10 |
| | | | | 320/103 |
| 2012/0113688 | A1* | 5/2012 | Liang | H02M 3/285 |
| | | | | 363/21.12 |
| 2012/0176817 | A1* | 7/2012 | Lu | H02M 3/285 |
| | | | | 363/21.02 |
| 2012/0300504 | A1* | 11/2012 | Ye | H02M 3/33569 |
| | | | | 363/21.02 |
| 2014/0049990 | A1* | 2/2014 | Limpaecher | H02M 3/24 |
| | | | | 363/15 |
| 2015/0372611 | A1* | 12/2015 | Hiller | H02M 7/48 |
| | | | | 363/163 |

* cited by examiner

FIG.7
(a) MODE I: 1 UNIT ALTERNATING OPERATION
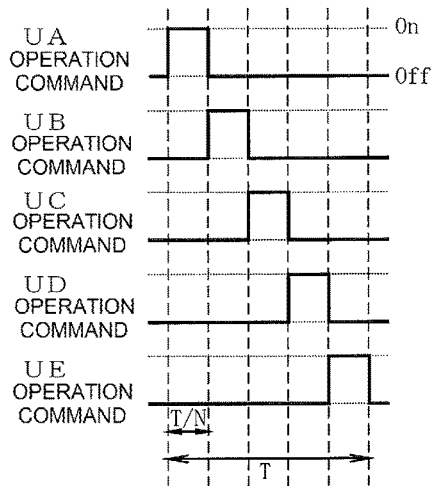
(b) MODE II: 2 UNITS ALTERNATING OPERATION
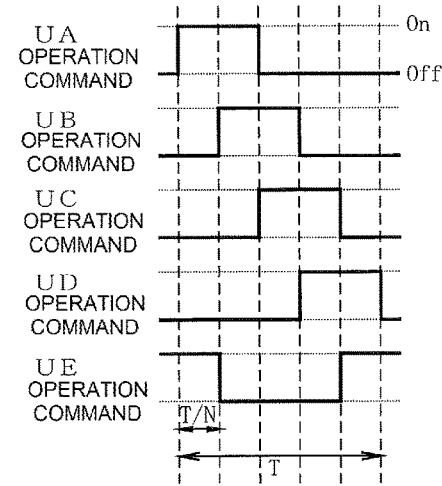
(c) MODE III: 3 UNITS ALTERNATING OPERATION
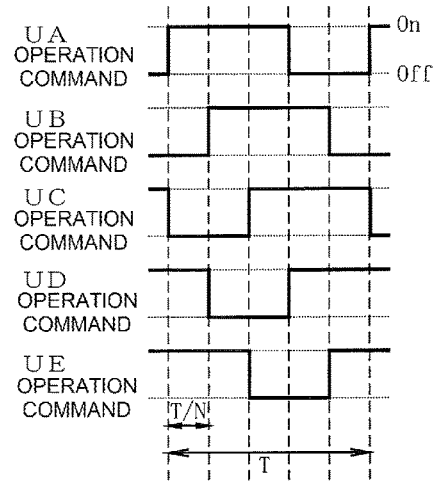
(d) MODE IV: 4 UNITS ALTERNATING OPERATION
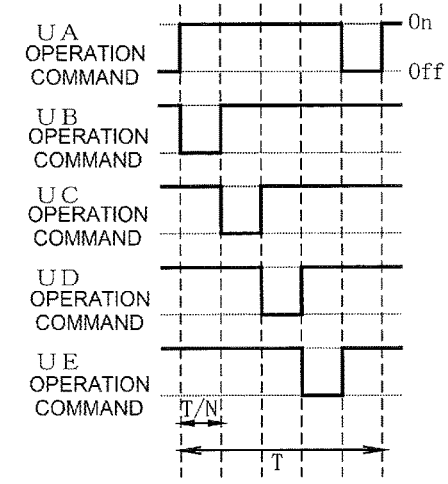
(e) MODE V: 5 UNITS PARALLEL OPERATION, A NORMAL OPERATION
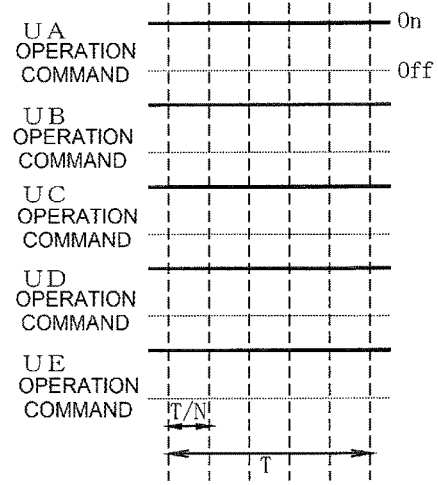

DC POWER SUPPLY EQUIPMENT

CROSS-REFERENCE TO RELATED APPLICATION

This application is based on, and claims priority to, Japanese Patent Application No. 2014-171047, filed on Aug. 26, 2014, the content of which is incorporated herein by reference.

BACKGROUND

1. Field

The present disclosure relates to a DC power supply equipment that uses a plurality of isolated DC-DC converter units and supplies a load with a DC voltage.

2. Description of Related Art

FIG. 10 is a circuit diagram of conventional DC power supply equipment. The DC power supply equipment as shown in FIG. 10 comprises capacitors 9a, 9b, and 9c connected in series between the negative and positive terminals of a DC power supply 50. A high frequency inverter 31a for converting a DC voltage into a high frequency AC voltage is connected between the both terminals of the capacitor 9a, and a rectifier circuit 33a is connected through a transformer 32a to the output side of the high frequency inverter 31a. In parallel to the series circuit consisting of the high frequency inverter 31a, the transformer 32a, and the rectifier circuit 33a, a series circuit consisting of a high frequency inverter 41a, a transformer 42a, and a rectifier circuit 43a is connected. An isolated DC-DC converter unit A (also referred to simply as "unit" A) is composed of the capacitor 9a, the inverters 31a, 41a, the transformers 32a, 42a, and the rectifier circuits 33a, 43a.

Similarly to the unit A, a unit B is composed of the capacitor 9b, the inverters 31b, 41b, the transformers 32b, 42b, and the rectifier circuits 33b, 43b; and a unit C is composed of the capacitor 9c, the inverters 31c, 41c, the transformers 32c, 42c, and the rectifier circuits 33c, 43c. The positive side output terminals of all the units A, B, and C are connected together, and the negative side output terminals of all the units are connected together to supply a DC voltage to a load not shown in FIG. 10.

In the unit A, for example, having a construction described above, the inverter 31a converts once a DC voltage into a high frequency AC voltage, the transformer 32a isolates and transforms the AC voltage, and then the rectifier circuit 33a rectifies the AC voltage to convert again into a DC voltage. Thus, functions of power supply equipment, voltage conversion and isolation from the load, are performed. A high frequency is employed because it generally allows a smaller transformer size. The series circuit composed of the inverter 31a, the transformer 32a, and the rectifier circuit 33a in the unit A, and the series circuit composed of the inverter 41a, the transformer 42a, and the rectifier circuit 43a in the unit A are called as an isolated DC-DC converter and a technology known in the art. Similar situations are applicable to the units B and C.

The DC input sides of the units A, B, and C are connected in series because of the following reason. The withstand voltages of the semiconductor switching devices used in the power conversion circuits such as the inverters 31a, 31b, and 31c have to be higher than the voltages Ea, Eb, and Ec of the capacitors 9a, 9b, and 9c. On the other hand, semiconductor switching devices generally tend to exhibit poor high speed switching performance with a withstand voltage higher than a certain value. The withstand voltage of semiconductor switching devices that are capable of operating at a switching frequency of around several tens of kHz is about 1,200 volts at the maximum, at present.

Semiconductor switching devices exist that exhibit a withstand voltage of 3,300 volts, which is higher than the voltage of the DC power supply 50, for example 2,000 volts. However, they can operate practically at a switching frequency of 1 kHz at the highest. One unit can be constructed using such semiconductor switching devices in the inverter 31a and connected to the DC power supply 50. However, the low switching frequency of the semiconductor switching device disturbs down-sizing of the transformer.

Accordingly, in the past, the DC input side of a plurality of units, the three units A, B, and C in the power supply equipment in FIG. 10, are connected in series to lower the DC input voltage per one unit and allow the use of the semiconductor switching device having a withstand voltage not higher than 1,200 volts. Because the rectifier circuit 33a in the unit A, for example, is isolated from the input side, the output potential can be determined at an arbitrary value. Thus, the power capacity of the power supply equipment can be achieved by connecting in parallel with rectifier circuit 33b and 33c of the unit B and the unit C. Although three units are connected in series in the DC input side of the power supply equipment of FIG. 10, the number of series connection of units can be determined arbitrarily in consideration of the voltage of the DC power supply 50 and the withstand voltages of the semiconductor switching devices and other components.

Japanese Unexamined Patent Application Publication No. 2014-018028 (paragraphs [0014] to [0022] and FIG. 1, in particular) ("JP '028" hereinafter) discloses a conventional technology for achieving power conversion equipment with a high input voltage using semiconductor switching devices with a relatively low withstand voltage by series connection of circuits. In this conventional technology, a plurality of chopper cells are connected in series. A control section compares voltage threshold values, the number of which is equal to the number of series connection of the chopper cells, with an output voltage command value of the power conversion equipment. Based on the comparison result, the semiconductor switching devices of the chopper cells corresponding to each voltage threshold value are one-pulse-operated to equalize the capacitor voltages in each chopper cell.

Another conventional technology is known in which conversion circuits such as chopper cells are not series-connected but switching devices themselves are connected in series. This technology, however, needs to strictly adjust switching timings in order to balance the voltages applied to the switching devices in the switching process. Thus, operation at high switching frequencies is difficult, which confines practical application examples.

In addition, the conventional technology shown in FIG. 10 also needs equal output power of the units. If there is imbalance in the output power between the units, the input voltage of the unit with a high output power decreases while the input voltage of the unit with a low output power increases. If operation is continued in this situation, the semiconductor switching devices used in a unit with an increased input voltage may undergo an overvoltage higher than the withstand voltage, causing failure of the power supply equipment.

In the DC power supply equipment of FIG. 10, a unit, for example unit A, has two parallel-connected isolated DC-DC converters, one isolated DC-DC converter composed of the inverter 31a, the transformer 32a, and the rectifier circuit 33a, and another isolated DC-DC converter composed of the inverter 41a, the transformer 42a, and the rectifier circuit 43a. The reason for this construction is described below.

From the requirement for energy saving in recent years, DC power supply equipment is demanded high efficiency not only around a rated power but also in light load conditions. Power conversion circuits used in DC power supply equipment usually operate at input and output voltages in a predetermined range. Thus, approximately proportional relationship exists between the power and running current in the circuit. When the current is small in a light load condition, resistive losses in semiconductor devices such as semiconductor switching devices and free-wheeling diodes, and in the winding of a transformer decreases. On the other hand, the iron loss in a transformer, which depends on the voltage but little depends on the current, is so-called a fixed loss, which does not change in the light load condition. Thus, a predetermined efficiency is hardly maintained unless the losses decrease when treating a lower power under the light load condition.

Accordingly, the DC power supply equipment of FIG. 10 can improve efficiency thereof in which a plurality of power conversion circuits, the isolated DC-DC converters in each unit, are parallel-connected in the DC input side, and one of the parallel-connected power conversion circuits is stopped operation in a light load condition to decrease the fixed loss. This type of method for improving efficiency in the light load condition has been proposed, in which a plurality of power conversion circuits are connected in parallel and the number of operation is controlled. In this method, the proportion of power capacities divided by the plural power conversion circuits can be not necessarily equal.

Japanese Unexamined Patent Application Publication No. 2006-333625 (paragraphs [0018] to [0025], and FIG. 1 and FIG. 2, in particular) ("JP '625" hereinafter) discloses an operation method in which a plurality of low capacity inverters and a plurality of high capacity inverters are all connected in parallel in the input side and in the output side, and the number of operating inverters is determined corresponding to the output power of the DC power supply equipment by selecting from the low capacity inverters, from the high capacity inverters, or from all the inverters.

In order to utilize semiconductor switching devices capable of high frequency switching operation in the conventional technology of FIG. 10, a DC input voltage is applied to a series circuit of three units to divide the input voltage to each unit into one third of the total DC input voltage, and each unit is divided into two isolated DC-DC converters connected in parallel to improve efficiency in a light load condition. Thus, the overall DC power supply equipment is constructed by three division times two division equals six divisions of isolated DC-DC converters.

This construction of multiple of isolated DC-DC converters does not occupy a huge volume because each isolated DC-DC converter has a low current carrying capacity. However, so-called dead space increases corresponding to the number of isolated DC-DC converters. In addition, the increased number of converters increases detectors and control circuits for detection and controlling functions, signal transmission components, and wiring lines in proportion to the number of converters, which causes increased costs. Therefore, the DC power supply equipment of FIG. 10 can still afford to improve in an overall size and costs.

The conventional technologies disclosed in JP '028 and JP '625 do not intend to solve the problems of size and cost increase due to increased number of chopper cells and high and low capacity inverters. The conventional technology disclosed in JP '028 is a power conversion equipment for delivering three-phase AC voltage in parallel connection of arms for three phases, an arm for one phase comprising a plurality of chopper cells connected in series. The conventional technology disclosed in JP '625 is an AC power supply system composed of a plurality of inverters connected in parallel. Thus, there has been no conventional technology that reduces the fixed loss without employing the redundancy of the isolated DC-DC converters like the construction of FIG. 10 in a DC power supply equipment comprising a plurality of isolated DC-DC converters with DC input sides thereof connected in series to take a divided portion of the DC input voltage.

SUMMARY

Embodiments of the present invention have been made in view of the problem in conventional technologies, and an aspect of the present invention is to provide DC power supply equipment that reduces the fixed loss without parallel connection of a plurality of isolated DC-DC converters in one unit, and that is small-sized and at a low cost.

To solve the above problem, DC power supply equipment according to a first aspect of the invention comprises: a plurality of isolated DC-DC converter units each composed of a capacitor and an isolated DC-DC converter that converts a DC voltage between both terminals of the capacitor into an AC voltage and converts the AC voltage into a DC voltage through isolation, wherein DC input sides of the plurality of units are connected in series and the DC output sides of the plurality of units are connected together in parallel. The DC power supply equipment also comprises control circuits to control the isolated DC-DC converters. The control circuits generate operation commands to operate portions of (some of) the plurality of units in an alternating sequence with a same time ratio in a predetermined control period when load current of the DC power supply equipment is smaller than a predetermined value, which means in a light load condition, and the control circuits control the isolated DC-DC converters of the units according to the operation command.

In a second aspect of the present invention, in the DC power supply equipment according to the first aspect of the invention, all the capacitors provided in the DC input side of the plurality of units are connected in series, and a DC power supply is connected between both ends of a series circuit of the capacitors.

In a third aspect of the present invention, in the DC power supply equipment according to the first aspect of the invention, all the capacitors provided in the DC input side of the plurality of units are connected in series, and DC output terminals of an AC-DC conversion circuit are connected to both ends of a series circuit of the capacitors.

In a fourth aspect of the present invention, in the DC power supply equipment according to the first aspect of the invention, output terminals of a rectifying circuit composing each of a plurality of AC-DC conversion circuits provided corresponding to the plurality of units are connected to both ends of each of the capacitors provided in a DC input sides of the plurality of units.

In a fifth aspect of the present invention, in the DC power supply equipment according to third or fourth aspects of the invention, the control period is sufficiently short as compared with the period of an AC voltage given to the AC-DC conversion circuit. This construction confines variation of the voltage of the capacitor in the DC input side of each unit. In a further aspect, the DC power supply equipment changes the control period according to load factor of the DC power supply equipment and more in detail, changes in inverse proportion to the load factor.

According to another aspect of the present invention, a number of simultaneously operated units is increased for a larger load factor. In a further aspect, the time ratio is changed corresponding to the load factor of the DC power supply equipment, or, more specifically, a magnitude of the load factor is divided into a predetermined number of ranges, and the time ratio in the range of small load factor is set to be smaller than the time ratio in the range of large load factor.

In embodiments of the present invention, the DC power supply equipment does not comprise (or need to comprise) a plurality of isolated DC-DC converters connected in parallel in a unit to changeover operation between the isolated DC-DC converters as in the conventional technology of FIG. 10. In a light load condition, DC power supply equipment of the invention is operated by alternately changing over a plurality of units each having a single isolated DC-DC converter. As a consequence, the number of isolated DC-DC converters in the overall DC power supply equipment is reduced to a minimum to achieve small size and low cost, as well as improved efficiency through reduced fixed loss. The variation of input current and voltage accompanying the operation and halt is absorbed in the capacitors in the DC input side. Thus, no imbalance is generated between the voltages of the capacitors.

BRIEF DESCRIPTION OF THE DRAWINGS

These and/or other aspects and advantages will become apparent and more readily appreciated from the following description of the embodiments, taken in conjunction with the accompanying drawings of which:

FIG. 7 illustrates modes of operating the units in the DC power supply equipment according to the fifth embodiment of the invention;

DESCRIPTION OF EMBODIMENTS

The following describes embodiments with reference to accompanying drawings.

Figure 1:
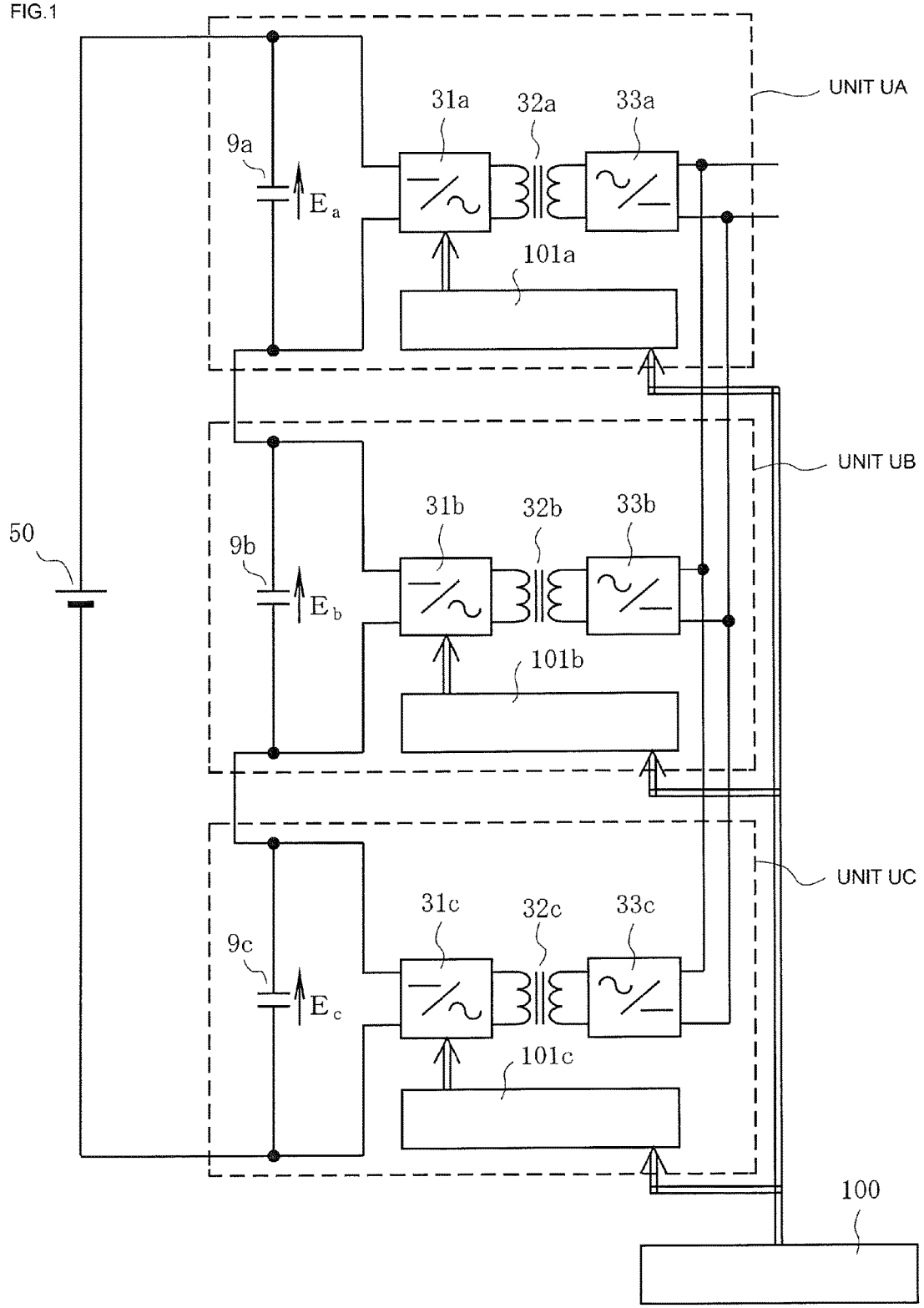
FIG. 1 is a circuit diagram of DC power supply equipment according to a first embodiment of the present invention.
Figure 10:
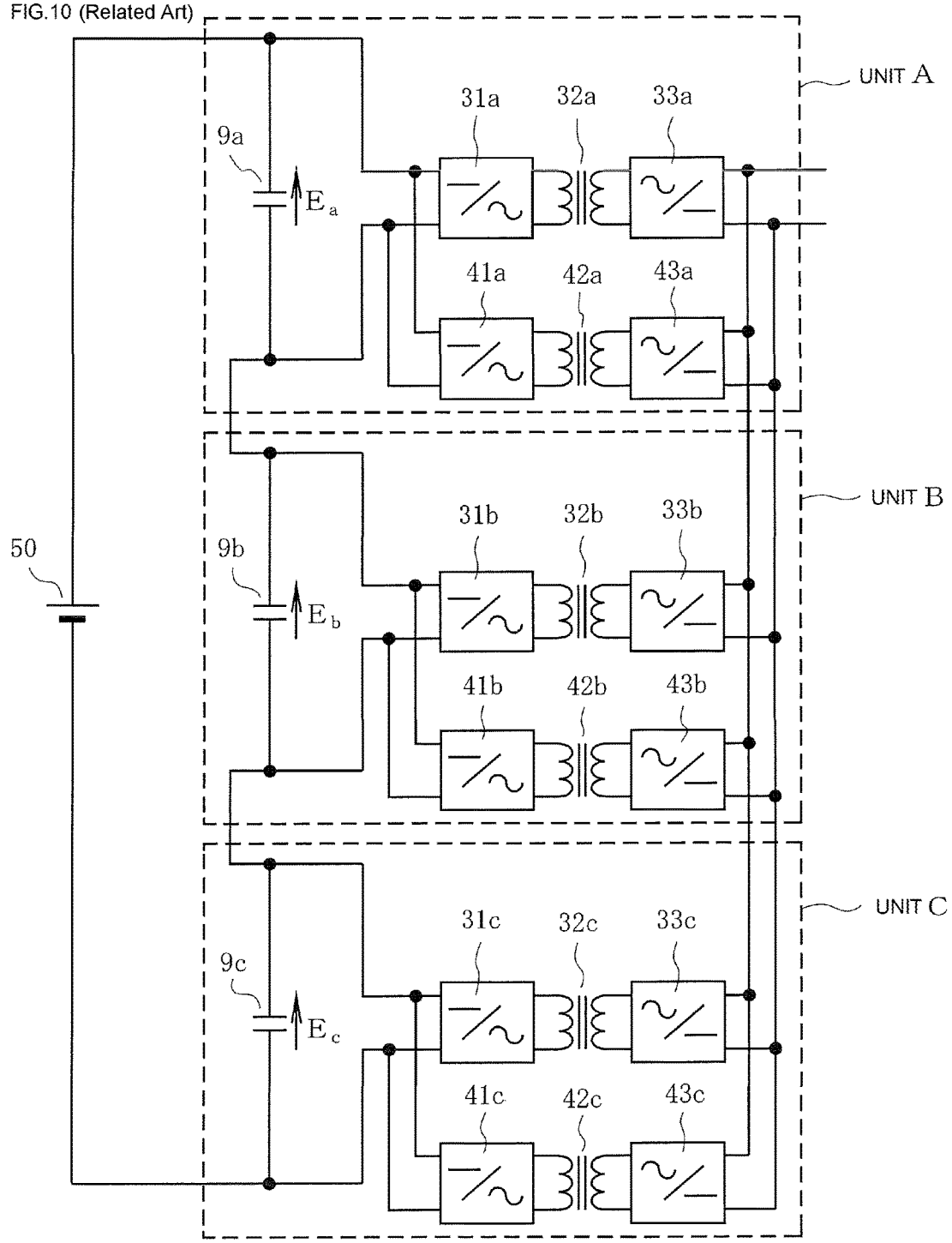
FIG. 10 is a circuit diagram of DC power supply equipment according to a conventional technology.

FIG. 1 is a circuit diagram of DC power supply equipment according to a first embodiment of the present invention. The parts same as those in FIG. 10 are given the same symbols.

As shown in FIG. 1, capacitors $9a$, $9b$, and $9c$ are connected in series between the positive and negative terminals of a DC power supply 50. A high frequency inverter $31a$ for converting a DC voltage into a high frequency AC voltage is connected between the both terminals of the capacitor $9a$. In the output side of the high frequency inverter $31a$, a rectifier circuit $33a$ is connected through a transformer $32a$. An isolated DC-DC converter is composed of the capacitor $9a$, the inverter $31a$, the transformer $32a$, and the rectifier circuit $33a$. A sub control circuit $101a$ is provided for controlling the semiconductor switching devices composing the inverter $31a$. A single unit UA is composed of the capacitor $9a$, the inverter $31a$, the transformer $32a$, the rectifier circuit $33a$, and the sub control circuit $101a$.

Likewise, a unit UB is composed of the capacitor $9b$, the inverter $31b$, the transformer $32b$, the rectifier circuit $33b$, and the sub control circuit $101b$. A unit UC is composed of the capacitor $9c$, the inverter $31c$, the transformer $32c$, the rectifier circuit $33c$, and the sub control circuit $101c$. All the positive side output terminals of the units UA, UB, and UC are connected together, and all the negative side output terminals of the units UA, UB, and UC are connected together, to supply a DC voltage to a load (not depicted).

The sub control circuits $101a$, $101b$, and $101c$ of the units UA, UB, and UC are controlled by a single main control circuit 100. The double lines with an arrow drawn from the main control circuit 100 to the sub control circuits $101a$, $101b$, and $101c$ shows that a plurality of signals are transmitted from the main control circuit 100.

Figure 2:
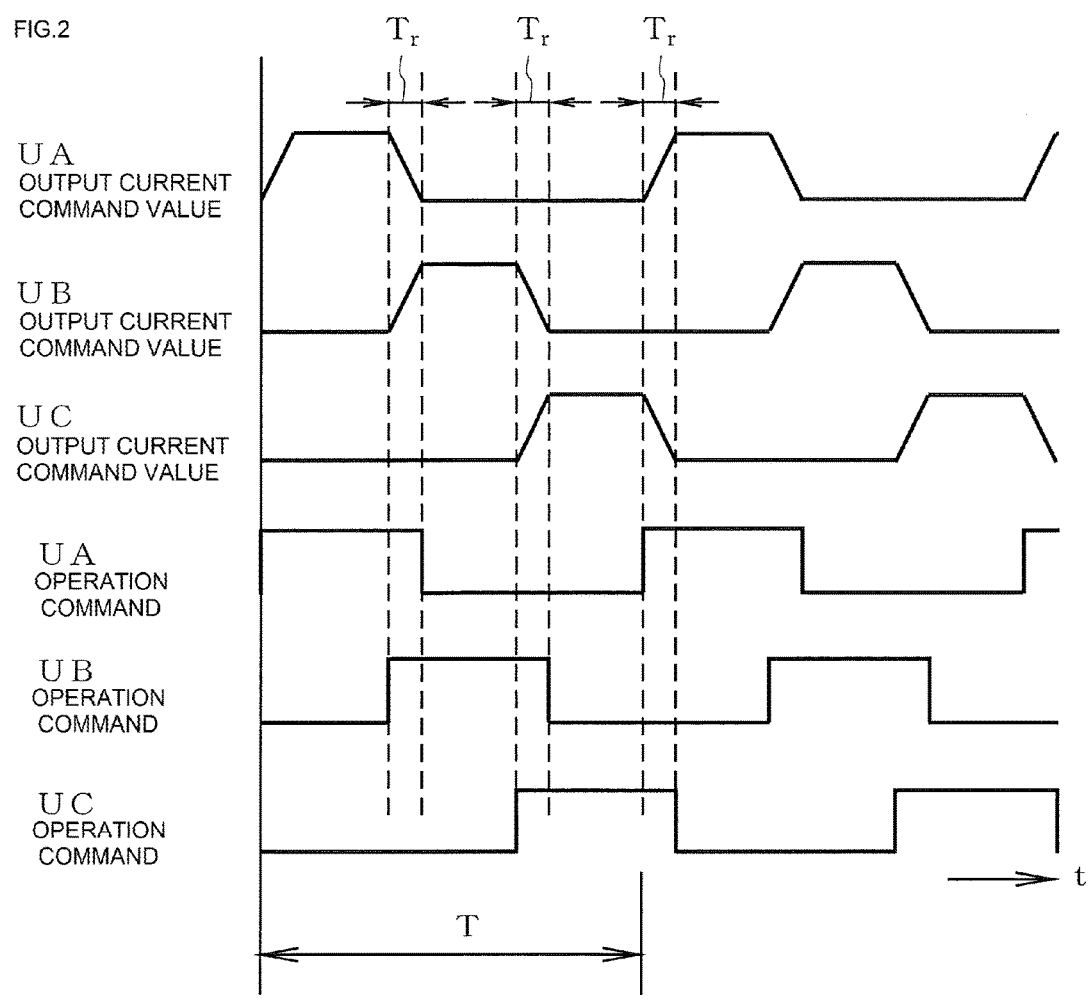
FIG. 2 illustrates commands of operation under a light load condition in the DC power supply equipment according to a first embodiment of the present invention.

FIG. 2 illustrates commands of operation under a light load condition in the DC power supply equipment according to the first embodiment of the present invention. The light load condition means that the load current for the DC power supply equipment is smaller than a predetermined value. The main control circuit 100 sends to the sub control circuits $101a$, $101b$, and $101c$, operation commands for the units UA, UB and UC, more specifically, operation commands for the inverters $31a$, $31b$, and $31c$. The main control circuit 100 also generates output current command values for the units UA, UB, and UC in synchronism with each of the operation commands in order to hold the output voltage of the DC power supply equipment detected by a voltage detector (not depicted) at a constant value.

The operation commands are for operating the units UA, UB, and UC alternately with an equal time factor in a control period T. An overlapping period Tr is provided as required in an operation command for a unit with an operation command for another unit. The output current command value of the unit UA, UB, or UC is designed to increase or decrease between zero and a predetermined value in the overlapping period Tr.

The sub control circuits $101a$, $101b$, and $101c$ control the inverters $31a$, $31b$, and $31c$ according to the operation commands with a known control method such as pulse width modulation (PWM) or pulse frequency modulation (PFM) so that the output current of each unit agrees with the output current command value. A unit in which the operation command is OFF, or at a low level, and the current command value is zero is stopped operation in order to prevent unnecessary losses from being generated. As a result, the units are operated intermittently in a time series. However, the variation of the input current to the inverters $31a$, $31b$, and $31c$ is absorbed by the capacitors $9a$, $9b$, and $9c$ as far as the control period T is sufficiently short. As a consequence, the voltages Ea, Eb, and Ec of the capacitors $9a$, $9b$, and $9c$ vary in a small range, and imbalance among the voltages Ea, Eb, and Ec does not occur in a DC-like behavior by equalizing the magnitudes and durations of the command values of the output current.

As shown in FIG. 2, the output current command value decreases gradually in a unit and increases gradually in another unit during an overlapping period Tr. This is in order to prevent the output voltage from undergoing disturbance due to a delayed response or overshoot from the command value of the output current for the units. If a smoothing capacitor with sufficiently large capacitance is connected to the output terminal of the unit, the overlapping period Tr is not necessarily provided.

Thus, a DC power supply equipment according to the first embodiment of the invention is controlled to operate and halt alternately the units UA, UB, and UC, which are connected in parallel in the DC output side, in the same time ratio in a control period T under a light load condition with a small output current. Comparing this construction and operation with that in the conventional technology shown in FIG. 10, the number of isolated DC-DC converters is reduced half to minimize the dead space and components of detectors and control circuits. At the same time, the fixed loss due to iron loss in the transformer is reduced to improve efficiency in the light load condition. This construction in the first embodiment does not cause voltage imbalance among capacitors in the plurality of isolated DC-DC converters connected in series in the DC input side.

Figure 3:
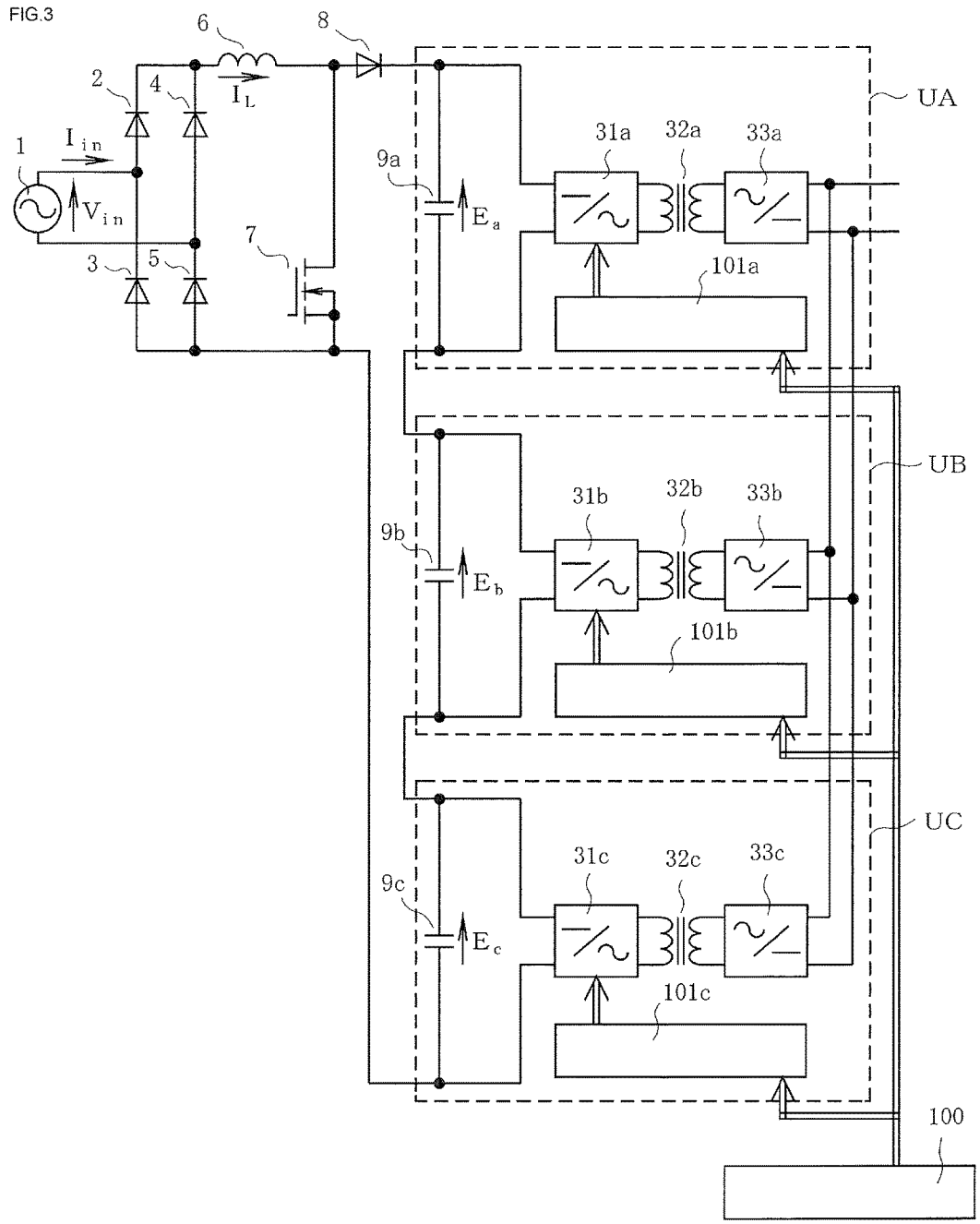
FIG. 3 is a circuit diagram of DC power supply equipment according to a second embodiment of the present invention.

FIG. 3 shows DC power supply equipment according to a second embodiment of the invention that uses an AC-DC conversion circuit corresponding to the DC power supply 50 shown in FIG. 1. The AC-DC conversion circuit is well known as a power factor correction (PFC) circuit in the art.

The PFC circuit in FIG. 3 comprises: a single phase AC power source 1, a rectifying circuit composed of diodes 2 through 5 connected to the both terminals of the single phase AC power source 1, a series circuit of an inductor 6 and a semiconductor switching device 7 connected to the output side of the rectifying circuit, and a diode 8 connected between their series connection point and an end of the capacitor 9a. The circuit consisting of the inductor 6, the semiconductor switching device 7, and the diode 8 is also known as a boosting chopper that delivers a raised voltage from a DC voltage. The semiconductor switching device 7 can be a metal oxide semiconductor field effect transistor (MOSFET) or alternatively, an isolated gate bipolar transistor (IGBT) or a bipolar junction transistor (BJT).

The functions of the DC power supply equipment according to the second embodiment are:

(1) To convert an AC input voltage Vin from the single phase AC power source 1 into a DC voltage having a desired magnitude, and keep the DC output voltage at a constant value irrespective of variation in the input voltage and load current.

(2) To make the AC input current Iin from the single phase AC power source 1 have a sinusoidal waveform with a power factor of approximately unity.

The capacitors 9a, 9b, and 9c, which are smoothing capacitors for the PFC circuit, necessarily have a capacitance value that can smooth the current component at a frequency of two times of the input frequency and limit the accompanying voltage variation within a predetermined value. The reason for this is that in the circumstance where the AC input voltage Vin indicated in FIG. 3 has a sinusoidal waveform and the AC input current Iin is also held with a sinusoidal waveform of power factor 1, the instantaneous value Pin of the input power, which is a product of an instantaneous value of Vin and an instantaneous value of Iin, is approximately zero in the vicinity of the zero-cross of the voltage Vin, and the Pin is at the maximum in the vicinity of the positive and negative peaks of the Vin. The average input power to the PFC circuit is a half of the maximum power. The instantaneous power of the PFC circuit receiving a rated power is always varying between the twice of the rated value and zero. Thus, a basic design condition is that the PFC circuit has to be provided in the output side thereof with a capacitor having a capacitance value that allows smoothing the varying instantaneous power.

When an operation as shown in FIG. 2 is conducted by the circuit of FIG. 3, if the control period T is sufficiently small, for example 1/10 of the period of the single phase AC power source 1, the control period T is 1/5 of the half period that corresponds to the twice frequency of the single phase AC power source 1. As a result, even though the input power to each unit UA, UB, and UC varies corresponding to the rated power of each unit, the variation of the voltage Ea, Eb, and Ec of each capacitor is sufficiently small as compared with the variation generate by the intrinsic operation of the PFC circuit, creating no problem.

Figure 4:
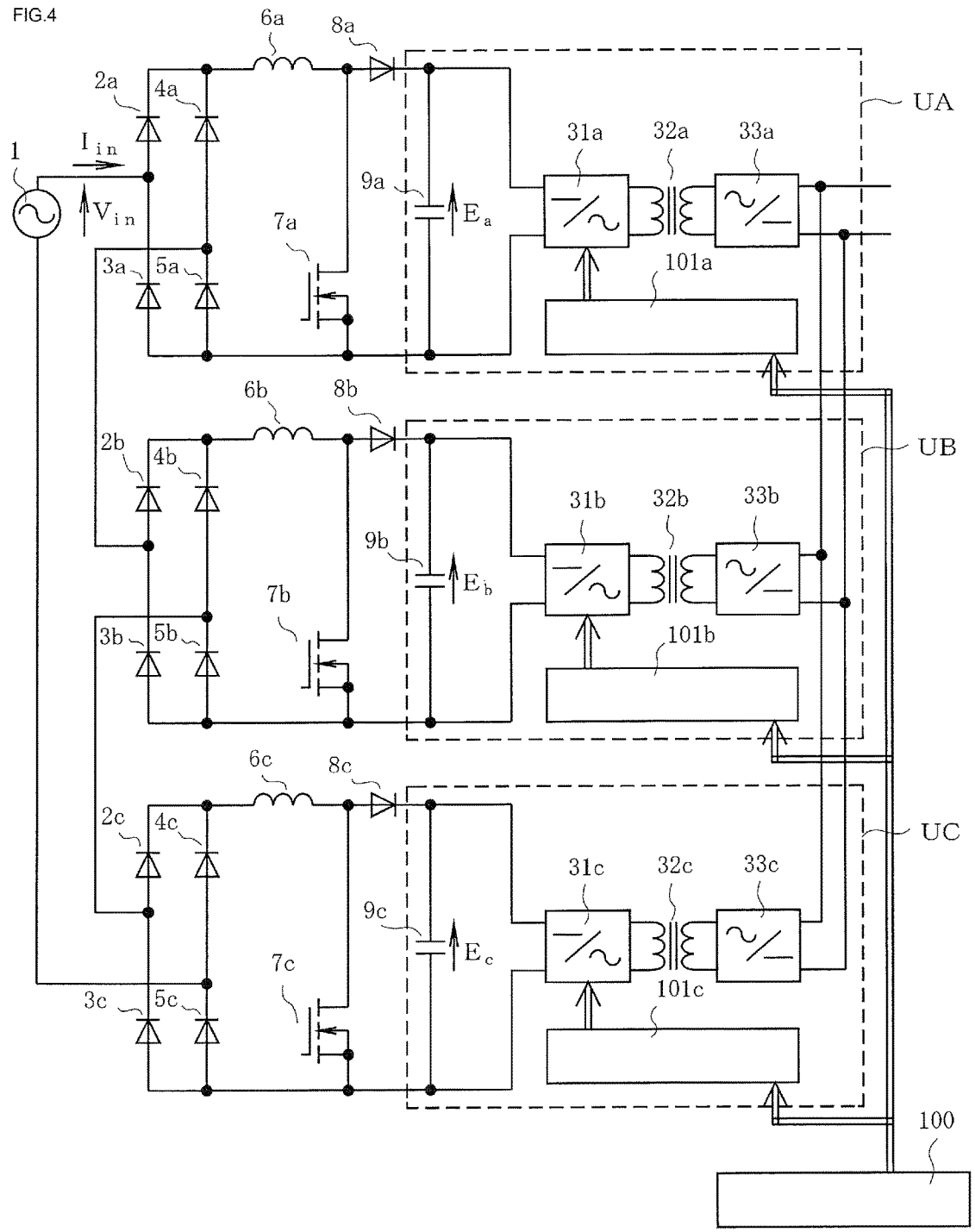
FIG. 4 is a circuit diagram of DC power supply equipment according to a third embodiment of the present invention.

FIG. 4 shows power supply equipment according to a third embodiment of the invention. The circuit of FIG. 4 comprises three PFC circuits, in an idea similar to the DC power supply equipment of the first embodiment, connected in series between the positive and negative terminals of the single phase AC power source 1. The three PFC circuits comprises three rectifying circuits composed of diodes 2a through 5a, diodes 2b through 5b, and diodes 2c through 5c, respectively. The circuit of FIG. 4 also comprises inductors 6a, 6b, and 6c, semiconductor switching devices 7a, 7b and 7c, and diodes 8a, 8b, and 8c.

The capacitors 9a, 9b, and 9c in the circuit of the third embodiment undergo potential variation caused by the operation of the corresponding PFC circuits. The inverters 31a, 31b, and 31c, however, are isolated in electric potential from each other inverter by the transformers 32a, 32b, and 32c as well as from the output side of the inverters. Thus, the inverters can be connected to any electric potential. The operation commands and the output current commands as shown in FIG. 2 are also applicable to the units UA, UB, and UC in the third embodiment. The function of overall DC power supply equipment of the third embodiment is the same as that of the DC power supply equipment of FIG. 3.

Figure 5:
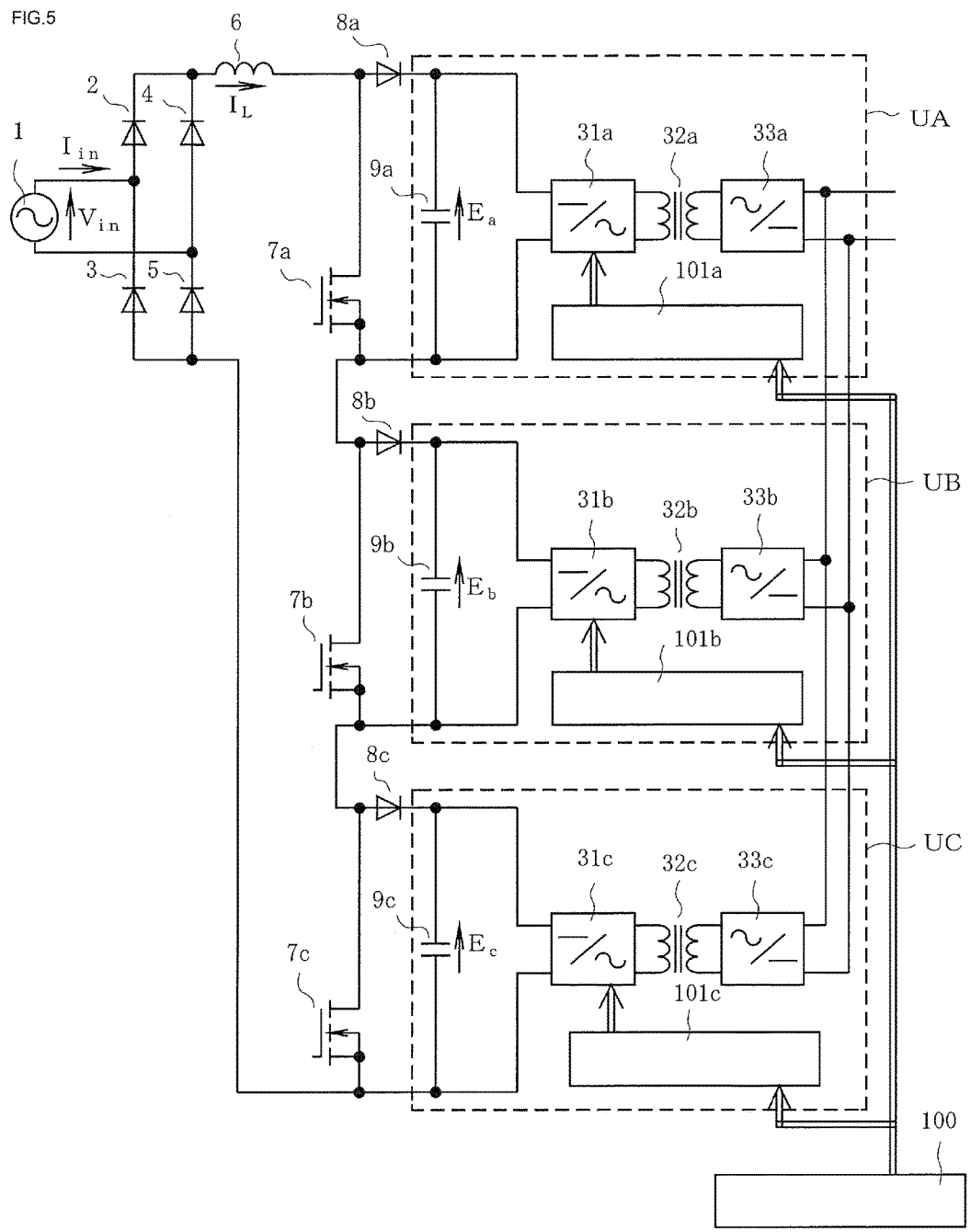
FIG. 5 is a circuit diagram of DC power supply equipment according to a fourth embodiment of the present invention.

FIG. 5 shows DC power supply equipment according to a fourth embodiment of the invention. The DC power supply equipment of the fourth embodiment comprises a common rectifying circuit composed of diodes 2 through 5 and a common inductor 6 of a PFC circuit, and series-connected semiconductor switching devices 7a, 7b, and 7c of boosting choppers corresponding to the units UA, UB, and UC. The operation commands and the output current commands as shown in FIG. 2 are also applicable to the units UA, UB, and UC in the fourth embodiment. The function of overall DC power supply equipment of the fourth embodiment is the same as that of the DC power supply equipment of FIG. 3 and FIG. 4. Thus, descriptions about them are omitted here.

In the DC power supply equipment of the first through fourth embodiments, the overlapping period Tr between the units UA, UB, and UC as shown in FIG. 2 are set in the repeated processes of operation and interruption of the units. The overlapping period Tr, in which two units are in operation at the same time, generates fixed losses for two units. The fixed loss is produced irrespective of load factor and includes the iron loss in the transformers and the iron loss due to the inductances in the rectifying circuits in the output side. In order to reduce this fixed losses, the overlapping period Tr is desired as short as possible.

On the other hand, the ripple voltages across the capacitors 9a, 9b, and 9c, which are smoothing capacitors of PFC circuits, in the embodiments 2, 3, and 4 indicated in FIGS. 3, 4, and 5 are proportional to the load factor. The load factor is defined to be the ratio of a load current to the rated output current of the DC power supply equipment. As a consequence, it is allowed to extend an operation time for one unit as the load factor decreases and to increase the variation range of the DC voltage in the process of exchange of an operating unit. This reduces the losses in the units in the restart process. The extension of the operation time of the units with decrease in the load factor can be achieved by changing the control period T indicated in FIG. 2 in inverse proportion to the load factor. In this process, it is desired to set the control period T so that a predetermined value is not exceeded by the sum of the ripple voltage in the operation of the PFC circuit and the voltage variation in the exchange process of the operating units.

Figure 6:
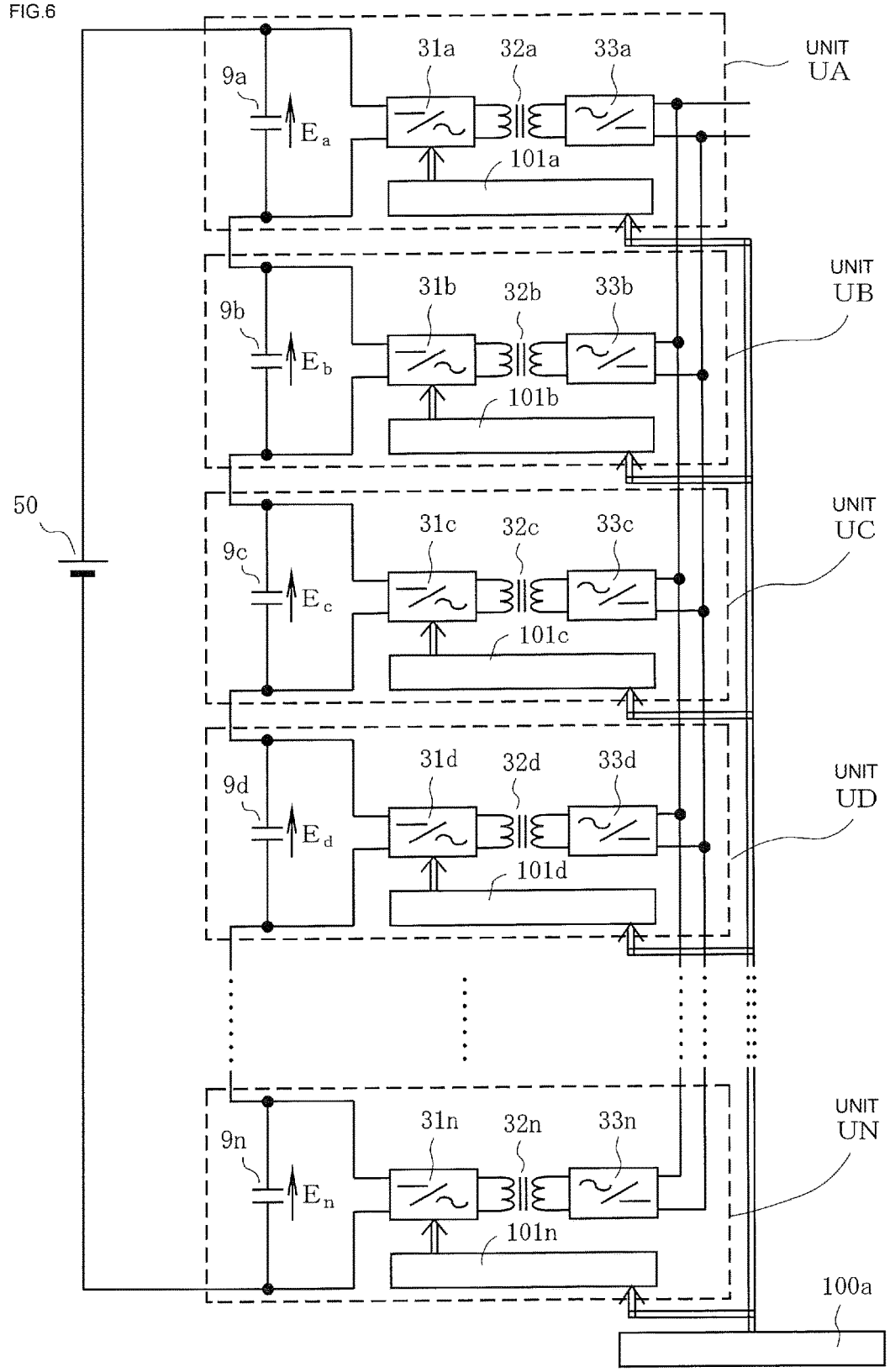
FIG. 6 is a circuit diagram of DC power supply equipment according to a fifth embodiment of the present invention.

FIG. 6 is a circuit diagram of a DC power supply equipment according to a fifth embodiment of the invention. The DC power supply equipment of the fifth embodiment is different from the DC power supply equipment of the first embodiment in that the DC power supply equipment of the fifth embodiment comprises larger number of units than the DC power supply equipment of the first embodiment. In the fifth embodiment, the capacitors in the DC input side of the multiple of units are connected in series. All the positive side terminals of the DC output side of the isolated DC-DC converters are connected together, and all the negative side terminals of the DC output side of the isolated DC-DC converters are connected together, supplying a DC voltage to a load (not shown in the figure). The unit UN in the final stage is composed of a capacitor 9n, a high frequency inverter 31n, a transformer 32n, a rectifying circuit 33n, and a sub control circuit 101n. Any number of units can be used to construct a DC power supply equipment.

The main control circuit 100a in FIG. 6 for controlling the units UA through UN can change the number of units that are operated at the same time corresponding to the load factor. More specifically, the main control circuit 100a controls to increase the number of units that operate at the same time as the load factor increases. This function in this embodiment further reduces the losses of the DC power supply equipment corresponding to a wide range of load conditions.

The controlled operation of the DC power supply equipment of the fifth embodiment is described with reference to FIG. 7. FIG. 7 shows operations of a DC power supply equipment composed of five units UA through UE. It is needless to say that the number of units is not limited to five. In the mode I indicated in FIG. 7, an operating unit is sequentially exchanged one by one during the control period T and the operation is similar to the operation shown in FIG. 2. The mark "TIN" indicated in FIG. 7 is an operation time, referred to as a unit period, of each unit, and "N" is the number of units, which is five in this example. The mode I is operated with a ratio of operation time of each unit with respect to the control period T of 1/N for every unit.

In the mode II through mode V, the operation time of each unit increases as twice, three times, four times, and five times, with increase in the load factor of the DC power supply equipment. In other words, the ratio of operating time to the control period T for each unit is increased, and the number of simultaneously operated units is increased as two units, three units, four units, and five units.

In the mode II illustrated in FIG. 7, each unit is operated for a duration of 2 (T/N) in the control period T in the sequence of the unit UA→UB→UC→UD→UE with a shift by the unit period (T/N). The mode III operates each unit for a duration of 3 (T/N), the mode IV operates each unit for a duration of 4 (T/N), and the mode V operates all the units UA, UB, UC, UD, and UE over the control period T in parallel operation, which is a normal operation.

In the operations shown in FIG. 7, an ON, or operation, timing of the operation command to a unit coincides with an OFF, or stop, timing of the operation command to another unit. However, it can be so designed, as shown in FIG. 2, that a certain overlapping period Tr is set in the operation command and the output current command value, and the output current command value increases or decreases in the overlapping period Tr.

Figure 8:
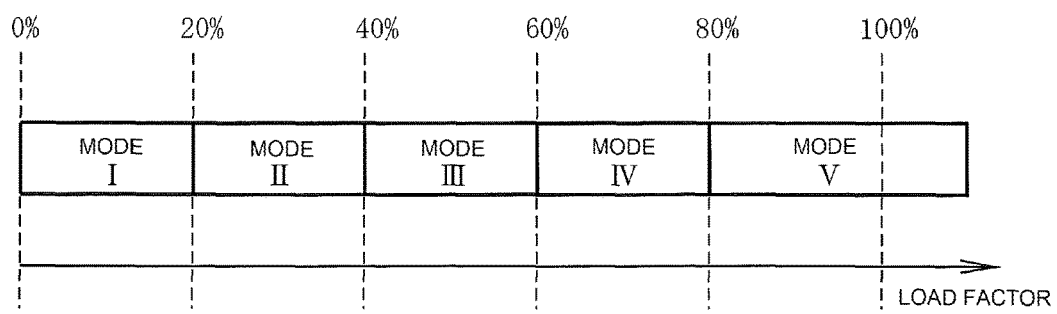
FIG. 8 illustrates an example of exchanging the operation modes shown in FIG. 7 corresponding to a load factor.
Figure 9:
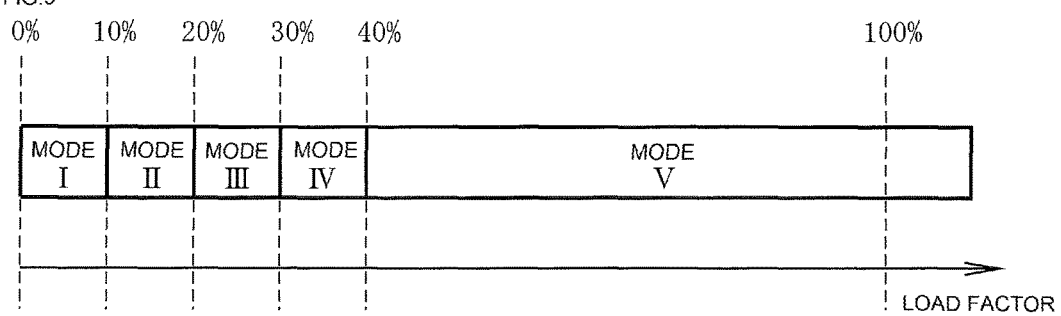
FIG. 9 illustrates another example of exchanging the operation modes shown in FIG. 7 corresponding to a load factor.

FIG. 8 and FIG. 9 show two examples of exchanging sequence of the modes I through V in FIG. 7 corresponding to variation of the load factor. FIG. 8 shows an example to change the operation modes as the load factor increases. Each mode is set so that each unit is operated not to exceed the load factor for one unit.

FIG. 9 shows an example to change the operation modes only in a light load period. The DC power supply equipment is so designed that the power conversion efficiency is at the highest when the output of the units is 50% of the rated value, for example, and the operation mode is so changed that the units are always operated under that condition. Thus, the operation losses are reduced. In this example composed of five units, since the load factor 20% corresponds to the output rating value of each unit for load factor 100%, the modes are exchanged with the step of load factor 10% as shown in FIG. 9. Thus, the power conversion efficiency of the units performs at the maximum.

Embodiments of the present invention can be applied to DC power supply equipment for use in wide range of fields in which DC input voltage is high, isolation from the load side is required, and small size and low cost are desired.

Reference signs and numerals are as follows:
1: single phase AC power source
2-5, 2a-5a, 2b-5b, 2c-5c, 8, 8a, 8b, 8c: diode
6, 6a, 6b, 6c: inductor
7, 7a, 7b, 7c: semiconductor switching device
9a, 9b, 9c, 9d-9n: capacitor
31a-31n: high frequency inverter
32a-32n: transformer
33a-33n: rectifier circuit
100, 100a: main control circuit
101a-101n: sub control circuit
UA-UN: isolated DC-DC converter unit, or simply 'unit'

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A DC power supply equipment comprising:
a plurality of isolated DC-DC converter units each including a capacitor and an isolated DC-DC converter that converts a DC voltage between both terminals of the capacitor into an AC voltage and converts the AC voltage into a DC voltage through isolation, the plurality of units having respective DC input sides connected in series with each other and respective DC output sides connected together in parallel with each other; and control circuits to control the isolated DC-DC converters over a predetermined control period that is repeated, the control circuits configured to, in response to a load current of the DC power supply equipment being detected by the DC power supply equipment as being smaller than a predetermined value, control the isolated DC-DC converters of the plurality of units such that the plurality of units operate in an alternating sequence in which:

each of the plurality of units are in an on-state during only a portion of the control period in each repetition of the control period, the portion of the control period being of a same time ratio of the control period for each of the plurality of units, and during the control period, the plurality of units alternate among each other in entering the on-state.

2. The DC power supply equipment according to claim 1, wherein all the capacitors provided in DC input sides of the plurality of units are connected in series so as to form a series of the capacitors, and a DC power supply is connected between both ends of the series of the capacitors.

3. The DC power supply equipment according to claim 2, wherein in operating the plurality of units operate in the alternating sequence, the power supply equipment is configured to change the control period in response to a change in a load factor of the DC power supply equipment.

4. The DC power supply equipment according to claim 3, wherein in operating the plurality of units operate in the alternating sequence, the power supply equipment is configured to change the control period in reverse proportion to the change in the load factor.

5. The DC power supply equipment according to claim 4, wherein in operating the plurality of units operate in the alternating sequence, the power supply equipment is configured to increase a number of the plurality of units being simultaneously operated in response to an increase in a load factor of the DC power supply equipment.

6. The DC power supply equipment according to claim 5, wherein in operating the plurality of units operate in the alternating sequence, the power supply equipment is configured to increase the time ratio in response to an increase in the load factor of the DC power supply equipment.

7. The DC power supply equipment according to claim 6, wherein in operating the plurality of units operate in the alternating sequence, the power supply equipment detects the load factor in predetermined gradations of magnitude, and the power supply equipment increases the time ratio in response to an increase in gradation of the magnitude of the load factor.

8. The DC power supply equipment according to claim 4, wherein in operating the plurality of units operate in the alternating sequence, the power supply equipment is configured to increase the time ratio in response to an increase in the load factor of the DC power supply equipment.

9. The DC power supply equipment according to claim 3, wherein in operating the plurality of units operate in the alternating sequence, the power supply equipment is configured to increase the time ratio in response to an increase in the load factor of the DC power supply equipment.

10. The DC power supply equipment according to claim 9, wherein in operating the plurality of units operate in the alternating sequence, the power supply equipment detects the load factor in predetermined gradations of magnitude, and the power supply equipment increases the time ratio in response to an increase in gradation of the magnitude of the load factor.

11. The DC power supply equipment according to claim 1, wherein all the capacitors provided in DC input sides of the plurality of units are connected in series so as to form a series of capacitors, and DC output terminals of an AC-DC conversion circuit are connected to both ends of the series of the capacitors.

12. The DC power supply equipment according to claim 11, wherein the control period is sufficiently short as compared with the period of an AC voltage given to the AC-DC conversion circuit.

13. The DC power supply equipment according to claim 11, wherein in operating the plurality of units operate in the alternating sequence, the power supply equipment is configured to change the control period in response to a change in a load factor of the DC power supply equipment.

14. The DC power supply equipment according to claim 13, wherein in operating the plurality of units operate in the alternating sequence, the power supply equipment is configured to change the control period in reverse proportion to the change in the load factor.

15. The DC power supply equipment according to claim 14, wherein in operating the plurality of units operate in the alternating sequence, the power supply equipment is configured to increase a number of the plurality of units being simultaneously operated in response to an increase in a load factor of the DC power supply equipment.

16. The DC power supply equipment according to claim 1, wherein output terminals of respective rectifying circuits, each of the rectifying circuits including a plurality of AC-DC conversion circuits provided corresponding to the plurality of units, are connected to both ends of each of the capacitors provided in the DC input sides of the plurality of units.

17. The DC power supply equipment according to claim 16, wherein the control period is sufficiently short as compared with the period of an AC voltage given to the AC-DC conversion circuit.

18. The DC power supply equipment according to claim 16, wherein in operating the plurality of units operate in the alternating sequence, the power supply equipment is configured to change the control period in response to a change in a load factor of the DC power supply equipment.

19. The DC power supply equipment according to claim 18, wherein in operating the plurality of units operate in the alternating sequence, the power supply equipment is configured to change the control period in reverse proportion to the change in the load factor.

20. The DC power supply equipment according to claim 19, wherein in operating the plurality of units operate in the alternating sequence, the power supply equipment is configured to increase a number of the plurality of units being simultaneously operated in response to an increase in a load factor of the DC power supply equipment.

21. The DC power supply equipment according to claim 1, wherein the predetermined value is a first predetermined value, the control circuits are configured to, in response to a load current of the DC power supply equipment being detected by the DC power supply equipment as being at least a second predetermined value greater than the first predetermined value, control the isolated DC-DC converters of the plurality of units such that each of the plurality of units operate in a constant on-state throughout the control period.

* * * * *